US006742178B1

(12) United States Patent
Berry et al.

(10) Patent No.: US 6,742,178 B1
(45) Date of Patent: *May 25, 2004

(54) SYSTEM AND METHOD FOR INSTRUMENTING APPLICATION CLASS FILES WITH CORRELATION INFORMATION TO THE INSTRUMENTATION

(75) Inventors: Robert Francis Berry, Austin, TX (US); Weiming Gu, Austin, TX (US); Riaz Y. Hussain, Austin, TX (US); Frank Eliot Levine, Austin, TX (US); Wai Yee Peter Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 09/620,729

(22) Filed: Jul. 20, 2000

(51) Int. Cl.[7] .................................................. G06F 9/44
(52) U.S. Cl. ........................ 717/130; 717/131; 717/128
(58) Field of Search ................................ 717/127, 128, 717/130, 131, 133, 151, 152, 154, 158

(56) References Cited

U.S. PATENT DOCUMENTS

| 4,746,920 A | 5/1988 | Nellen et al. ................ 340/825 |
| 4,821,220 A | 4/1989 | Duisberg ..................... 364/578 |
| 5,047,919 A | 9/1991 | Sterling et al. .............. 364/200 |
| 5,161,226 A | 11/1992 | Wainer ......................... 395/650 |
| 5,179,702 A | 1/1993 | Spix et al. ................... 395/650 |
| 5,307,499 A | 4/1994 | Yin ............................. 395/700 |
| 5,355,487 A | 10/1994 | Keller et al. ................. 395/650 |
| 5,371,878 A | 12/1994 | Coker .......................... 395/500 |
| 5,442,758 A | 8/1995 | Slingwine et al. ........... 395/375 |
| 5,450,586 A | 9/1995 | Kuzara et al. ............... 395/700 |
| 5,459,868 A | 10/1995 | Fong ........................... 395/700 |

(List continued on next page.)

FOREIGN PATENT DOCUMENTS

| DE | WO 94/14117 | 6/1994 | ........... G06F/11/00 |
| DE | 296 00 609 U1 | 3/1997 | ........... G05B/19/05 |
| WO | WO 96/12224 | 4/1996 | ........... G06F/9/445 |

OTHER PUBLICATIONS

Pavlopoulou, Christina and Young, Michal, "Residual Test Coverage Monitoring", p. 277–284, 1999 ICSE, Los Angeles, CA retrieved from ACM Portal database Mar. 17, 2003.*

(List continued on next page.)

*Primary Examiner*—Tuan Dam
*Assistant Examiner*—Mary Steelman
(74) *Attorney, Agent, or Firm*—Duke W. Yee; Leslie A. Van Leeuven; Stephen J. Walder, Jr.

(57) ABSTRACT

The present invention is directed to a system and method for modifying a class file for the purpose of instrumenting without requiring separate files to correlate the instrumentation. A class file is instrumented with hooks. Each hook is injected in a method at a critical point in the code for tracking path flow, such as where the method will be entered or exited. Each hook includes an identifier to identify the method in which it is injected. Rather than using the method's name, hooks use unique major and minor codes to identify the method. Static initializers are declared for the class to output other hooks identifying the methods being instrumented. When a class is loaded, the static initializers are executed and hooks identifying the method name and the major and minor codes for each instrumented method are output to, for instance, a trace record. Then, when a method is entered or exited, the hooks identifying the entry or exit are also outputted to a trace record. When postprocessing the trace records, class and instrumentation correlation information is available for merging from trace records in the trace stream.

15 Claims, 4 Drawing Sheets

U.S. PATENT DOCUMENTS

| | | | | |
|---|---|---|---|---|
| 5,483,654 A | | 1/1996 | Staron et al. ................ | 395/650 |
| 5,485,574 A | | 1/1996 | Bolosky et al. ......... | 395/183.11 |
| 5,509,070 A | | 4/1996 | Schull ........................... | 380/4 |
| 5,613,118 A | | 3/1997 | Heisch et al. ............... | 395/709 |
| 5,682,328 A | | 10/1997 | Roeber et al. .............. | 364/550 |
| 5,706,515 A | | 1/1998 | Connelly et al. ........... | 395/676 |
| 5,742,672 A | | 4/1998 | Burk .......................... | 379/198 |
| 5,758,061 A | * | 5/1998 | Plum ........................... | 714/35 |
| 5,761,380 A | | 6/1998 | Lewis et al. .................. | 395/12 |
| 5,768,500 A | | 6/1998 | Agrawal et al. ....... | 395/184.01 |
| 5,799,143 A | | 8/1998 | Butt et al. ............. | 395/183.14 |
| 5,845,077 A | | 12/1998 | Fawcett ................ | 395/200.51 |
| 5,872,909 A | | 2/1999 | Wilner et al. .......... | 395/183.14 |
| 5,884,080 A | | 3/1999 | Blandy et al. .............. | 395/704 |
| 5,884,082 A | | 3/1999 | Seidel et al. ................ | 395/704 |
| 5,908,470 A | | 6/1999 | Stonecypher, Jr. .......... | 713/502 |
| 5,919,247 A | | 7/1999 | Van Hoff et al. ........... | 709/217 |
| 5,964,846 A | | 10/1999 | Berry et al. ................ | 709/400 |
| 5,966,540 A | | 10/1999 | Lister et al. ................ | 395/712 |
| 5,978,578 A | | 11/1999 | Azarya et al. .............. | 395/701 |
| 5,991,543 A | | 11/1999 | Amberg et al. ............. | 395/712 |
| 5,995,757 A | | 11/1999 | Amberg et al. ............. | 395/712 |
| 6,006,035 A | | 12/1999 | Nabahi ....................... | 395/712 |
| 6,026,237 A | * | 2/2000 | Berry et al. ................ | 717/130 |
| 6,151,701 A | * | 11/2000 | Humphreys et al. ........ | 717/130 |
| 6,186,677 B1 | * | 2/2001 | Angel et al. ................ | 717/118 |
| 6,314,558 B1 | * | 11/2001 | Angel et al. ................ | 717/118 |
| 6,481,008 B1 | * | 11/2002 | Chaiken et al. ............. | 717/158 |
| 6,557,168 B1 | * | 4/2003 | Czajkowski ................ | 717/151 |

OTHER PUBLICATIONS

Sinha, Saurabh and Harrold, Mary Jean, "Analysis of Programs with Exception–Handling Constructs", p. 1–10, IEEE 1998, retrieved from IEEE dtabase Mar. 17, 2003.*

Sinha, Saurabh and Harrold, Mary Jean, "Criteria for Testing Excetpion–Handling Constructs in Java Programs", p. 1–36, 1999, retrieved from google.com, Mar. 17, 2003.*

A Unifying Approach to Performance Analysis In The Java Environment; Alexander et al; vol. 39, No. 1; pp 1–16.

Java Virtual Machine Profiler Interface; Viswanathan et al.; vol. 39, No. 1; pp. 1–14.

Call Path Profiling of Monotonic Program Resources in UNIX; Hall et al; Jun. 24–25, 1993; pp. 1–13.

Exploiting Hardware Performance Counters with Flow and Context Sensitive Profiling; Ammons et al; 1997; pp. 85–96.

Optimally Profiling and Tracing Programs; Ball et al; Jul. 1994; pp 1319–1360.

Data Structure and Insertion Algorithm for Representing Asynchronous Occurrences for Visualization by Trace Visualization Tools using Ghant Charts with Occurrence Hierarchies; International Business Machines Technical Disclosure Bulletin; vol. 36, No. 07, Jul. 1993; pp. 547–557.

Adaptive Trace–Directed Program Restructuring; International Business Machines Technical Disclosure Bulletin; vol. 37 No. 02B, Feb. 1994; pp. 115–116.

Profiling and Tracing Dynamic Library Usage Via Interposition; Curry; USENIX Conference; 1994; pp. 267–278.

Application of Interpreter for Debugging Functions; International Business Machines Technical Disclosure Bulletin; vol. 36, No 09B, Sep. 1993; pp 67–68.

Minimizing Locking to Access Global Shared Data; International Business Machines Technical Disclosure Bulletin; Feb. 1995; pp. 619–622.

* cited by examiner

TRACE RECORD FILE
500

| RECORD NUMBER | MAJOR | MINOR | CLASS/METHOD | TIMESTAMP | DESCRIPTION |
|---|---|---|---|---|---|
| 0 | 22 | 01 | TEST.method_X() | | |
| 1 | 22 | 81 | TEST.method_X_exit | | |
| 2 | 22 | 02 | TEST.method_Y() | | |
| 3 | 22 | 82 | TEST.method_Y_exit | | |
| 4 | 12 | 1 | | 15:985860940 | DISPATCH THREAD: e18507a0 |
| 5 | 22 | 1 | | 15:985833507 | ENTRY |
| 6 | 12 | 1 | | 15:985845671 | DISPATCH THREAD: e17d5bb0 |
| 7 | 12 | 1 | | 15:985860940 | DISPATCH THREAD: e1807a0 |
| 8 | 22 | 81 | | 15:985833507 | EXIT |
| 9 | 22 | 2 | | 15:985833507 | ENTRY |
| 10 | 22 | 82 | | 15:985833507 | EXIT |

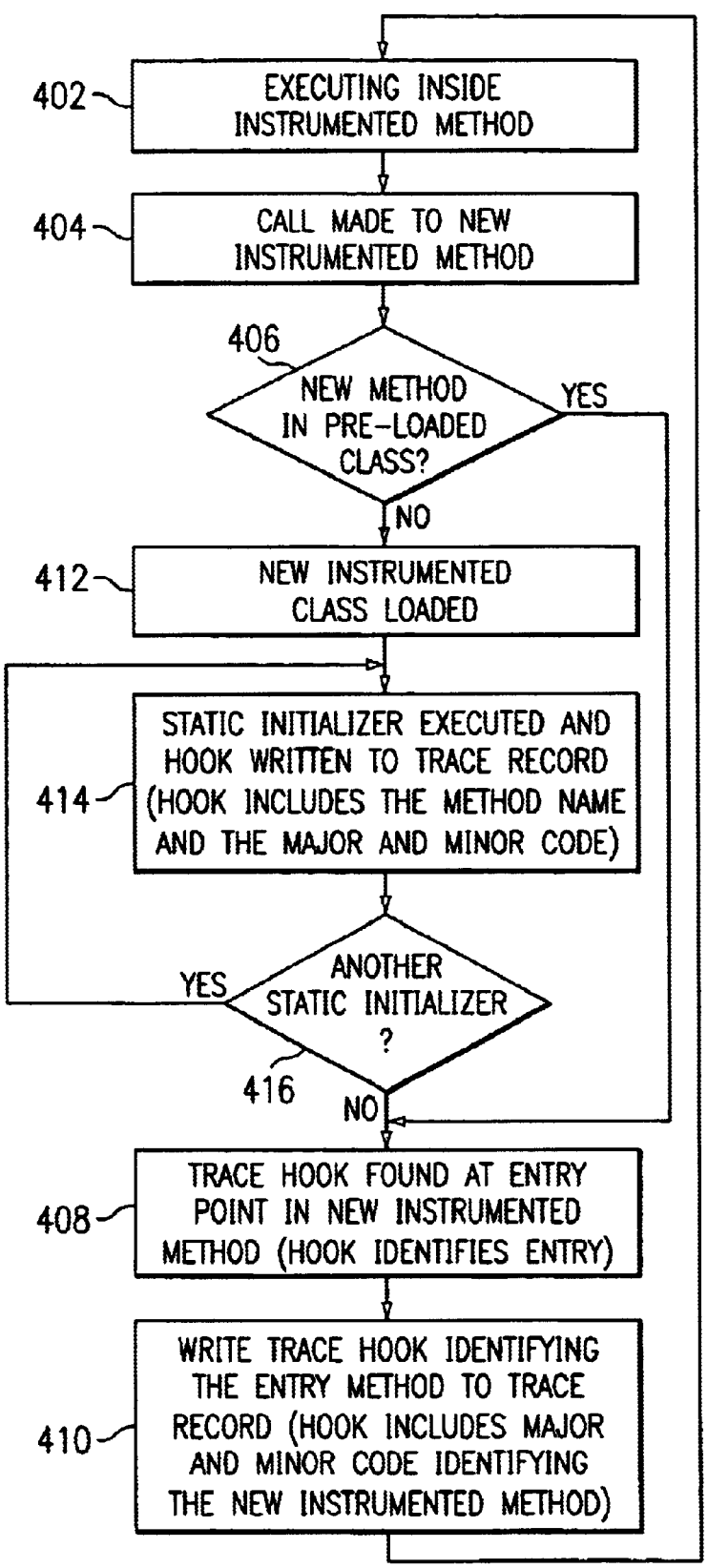

SYSTEM AND METHOD FOR INSTRUMENTING APPLICATION CLASS FILES WITH CORRELATION INFORMATION TO THE INSTRUMENTATION

CROSS REFERENCE TO RELATED APPLICATION

The present application is related to copending U.S. patent application Ser. No. 09/620,725 entitled "SYSTEM AND METHOD FOR INJECTING HOOKS INTO JAVA CLASSES TO HANDLE EXCEPTION AND FINALIZATION PROCESSING" filed even date herewith and to U.S. patent application Ser. No. 08/963,080 , now U.S. Pat. No. 6,026,237 entitled "SYSTEM AND METHOD FOR DYNAMIC MODIFICATION OF CLASS FILES" filed Nov. 3, 1997. The contents of the above mentioned commonly assigned, co-pending U.S. Patent application and U.S. Patent are hereby incorporated herein by reference for all purposes.

FIELD OF THE INVENTION

The present invention relates generally to data processing systems, and in particular, methods for correlating instrumentation to class files in an object oriented programming language.

BACKGROUND OF THE INVENTION

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules, which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event along with a value related to the amount of resources consumed.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas, which might benefit most from improvements to the code.

Thus, it is at least as important to accurately map the execution path flow between modules as it is to accurately measure the resources consumed by a particular module. If the path flow cannot be accurately mapped, then the consumption of resources attributed to a particular module is also suspect. One way of tracking path flow is by instrumenting calls to individual modules. Class files are instrumented with trace hooks which may be written to a record each time a module (or method) is entered or exited. For example, at each method entry event a entry trace hook is output for that method entry and at each method exit event a trace exit hook is output for that method exit.

A trace hook identifies a software method by major and minor codes unique to that method. Therefore, when instrumenting a method, a file is created that correlates method names to major and minor codes for the method. This file is called the hook definition file (HDF). Each time the instrumention of a class is modified, the existing HDF must be updated or a new file created. The HDF is stored for use in the postprocessing phase.

When a method entry or exit event occurs, the hook for that event is output, along with metric information related to the amount of resources consumed. The hook includes the unique major/minor codes for the instrumented method. In postprocessing phase, the amount of resources consumed by each method, or other software module, may be calculated from the trace output and a detailed profiling information record may be generated. The profiling information record identifies each method by unique major and minor code which is obtained from the hook. The record is far more usable if the major and minor codes are replaced by the corresponding method name. Therefore, the current version of the HDF is found and merged with the profiling information record.

Methods may be misidentified or left unnamed if the current version of the HDF is not used for merging with the report. Also, because the HDF is a separated file and not physically associated with any class, the HDF may become lost, necessitating the user generate a new HDF version prior to analyzing the profiling information report.

Consequently, it would be desirable to have a system and method for providing correlation information between class files and instrumentation. It would be desirable to have a system and method which would associate that information with the class file from which it was created.

SUMMARY OF THE INVENTION

A class file is instrumented with hooks. Each hook is injected in a method at a critical point in the code for tracking path flow, such as where the method will be entered or exited. Each hook includes an identifier to identify the method in which it is injected. Rather than using the method's name, hooks use unique major and minor codes to identify the method. Static initializers are declared for the class to output other hooks identifying the methods being instrumented. When a class is loaded, the static initializers are executed and hooks identifying the method name and the major and minor codes for each instrumented method are output to, for instance, a trace record. Then, when a method is entered or exited, the hooks identifying the entry or exit are also outputted to a trace record. When postprocessing the trace records, class and instrumentation correlation information is available for merging from trace records in the trace stream.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIG. 4 is a flowchart depicting a process for executing code and outputting hooks that eliminate the need for a separate correlation file for instrumentation in accordance with a preferred embodiment of the present invention;

DETAILED DESCRIPTION OF A PREFERRED EMBODIMENT

The invention may be implemented on a variety of hardware platforms, including personal computers, workstations, embedded systems, mini-computers, and mainframe computers. Many of the steps of the method according to the present invention may be advantageously implemented on parallel processors of various types.

Figure 1A:
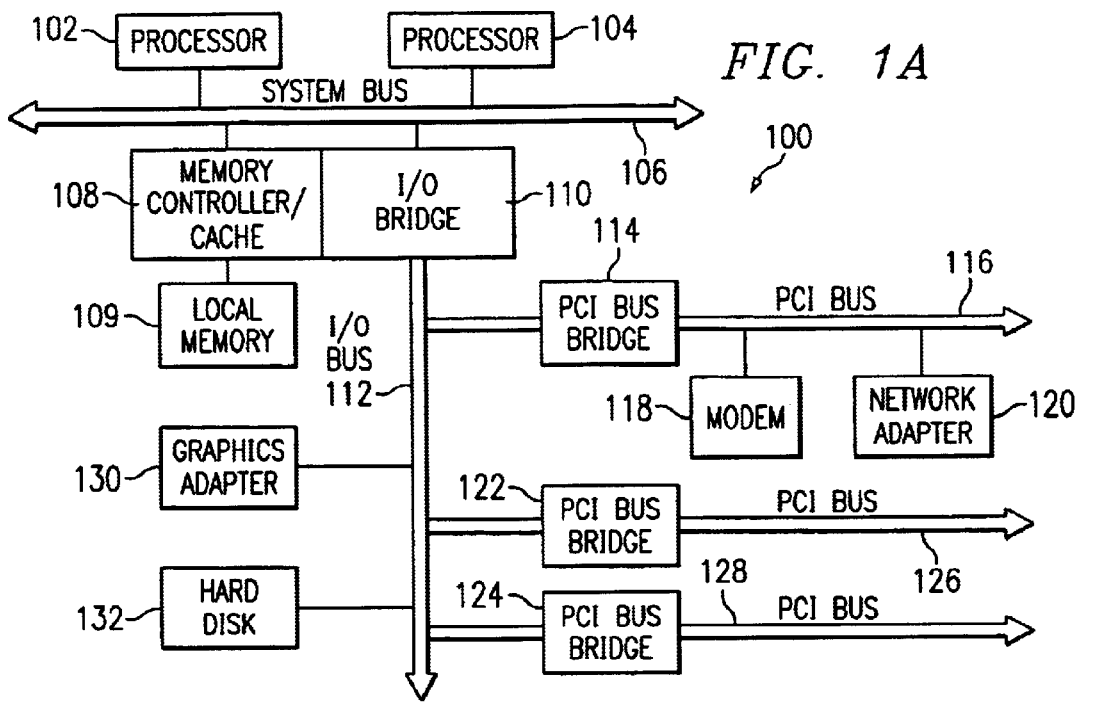
FIG. 1A is a block diagram of a data processing system which may be implemented as a server is depicted in accordance to the present invention.

With reference now to FIG. 1A, a block diagram of a data processing system which may be implemented as a server is depicted. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O Bus Bridge 110 is connected to system bus 106 and provides an interface to I/O bus 112. Memory controller/cache 108 and I/O Bus Bridge 110 may be integrated as depicted.

Peripheral component interconnect (PCI) bus bridge 114 connected to I/O bus 112 provides an interface to PCI local bus 116. A modem 118 may be connected to PCI local bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, server 100 allows connections to multiple network computers. A memory mapped graphics adapter 130 and hard disk 132 may also be connected to I/O bus 112 as depicted, either directly or indirectly.

Those of ordinary skill in the art will appreciate that the hardware depicted in FIG. 1A may vary. For example, other peripheral devices, such as optical disk drive and the like also may be used in addition or in place of the hardware depicted. The depicted example is not meant to imply architectural limitations with respect to the present invention.

The data processing system depicted in FIG. 1A may be, for example, an IBM RISC/System 6000 system, a product of International Business Machines Corporation in Armonk, N.Y., running the Advanced Interactive Executive (AIX) operating system.

Figure 1B:
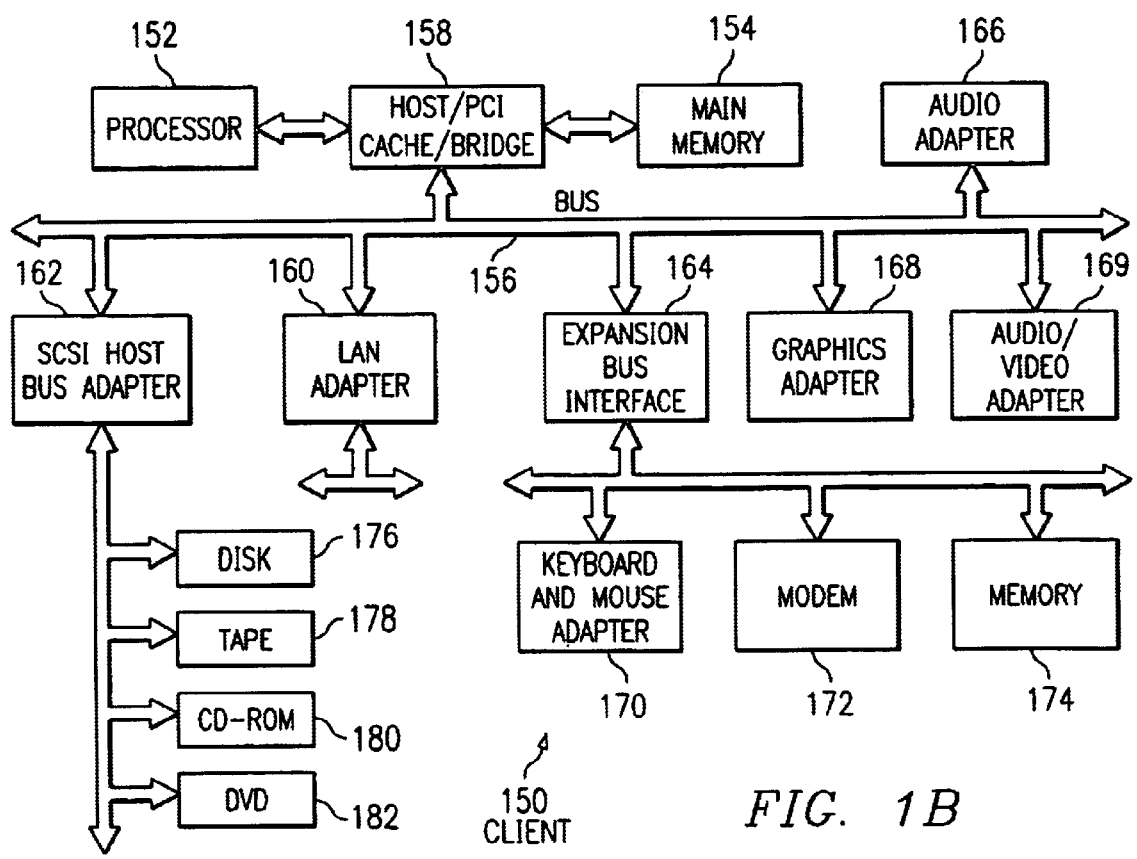
FIG. 1B is a block diagram of a data processing system in which the present invention may be implemented is illustrated.

With reference now to FIG. 1B, a block diagram of a data processing system in which the present invention may be implemented is illustrated. Data processing system 150 is an example of a client computer. Data processing system 150 employs a peripheral component interconnect (PCI) local bus architecture. Although the depicted example employs a PCI bus, other bus architectures such as Micro Channel and ISA may be used. Processor 152 and main memory 154 are connected to PCI local bus 156 through PCI Bridge 158. PCI Bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 166 by add-in boards inserted into expansion slots. Expansion bus interface 164 provides a connection for a keyboard and mouse adapter 170, modem 172, and additional memory 174. SCSI host bus adapter 162 provides a connection for hard disk drive 176, tape drive 178, CD-ROM 180, and DVD drive 182 in the depicted example. Typical PCI local bus implementations will support three or four PCI expansion slots or add-in connectors.

An operating system runs on processor 152 and is used to coordinate and provide control of various components within data processing system 150 in FIG. 1B. The operating system may be a commercially available operating system such as JavaOS for Business™ or OS/2™, which are available from International Business Machines Corporation™. JavaOS operating system is loaded from a server on a network to a network client and supports Java programs and applets. A couple of characteristics of the JavaOS operating system that are favorable for performing traces with stack unwinds, as described below, are that it does not support paging or virtual memory. An object-oriented programming system such as Java may run in conjunction with the operating system and may provide calls to the operating system from Java programs or applications executing on data processing system 150. Instructions for the operating system, the object-oriented operating system, and applications or programs are located on storage devices, such as hard disk drive 176 and may be loaded into main memory 154 for execution by processor 152. Hard disk drives are often absent and memory is constrained when data processing system 150 is used as a network client.

Those of ordinary skill in the art will appreciate that the hardware in FIG. 1B may vary depending on the implementation. For example, other peripheral devices, such as optical disk drives and the like may be used in addition to or in place of the hardware depicted in FIG. 1B. The depicted example is not meant to imply architectural limitations with respect to the present invention. For example, the processes of the present invention may be applied to a multiprocessor data processing system.

Upon executing an instrumented class, a series of trace records may be output to a trace file. A trace file contains the information necessary to map the execution path flow between methods and to calculate the resources consumed by a particular method. When a method entry or exit event occurs, the hook for that event is output to a trace record, along with metric information related to the amount of resources consumed. The hook includes the unique major/minor codes for the instrumented method. In postprocessing phase, the amount of resources consumed by each method, is calculated from the trace output and a detailed profiling information record may be generated. The profiling information record identifies each method by unique major and minor code which is obtained from the hook. The record is far more usable if the major and minor codes are replaced by the corresponding method name.

According to the prior art, a header or hook definition file (HDF) is used to record information about the mapping between specific trace hook major and minor codes and the methods into which they are being inserted. For example, consider class "TEST" having two methods, <method_X> and <method_Y>. As each method is instrumented with an entry and exit hook, entries will be made in the HDF file that identify the major and minor codes for those hooks, along with the class name and method signature. The entries, for example, may look as follows:

| major/minor | class/method |
| --- | --- |
| 22/01 | TEST.method_X(I) |
| 22/81 | TEST.method_X_exit |
| 22/02 | TEST.method_Y() |
| 22/82 | TEST.method_Y_exit |

In the above excerpt from a possible HDF file, major code 22 and minor code 01 are associated with the trace hook placed at the entry of method_X in class TEST. The method signature (e.g., "(I)") is recorded to allow for clear discrimination between overloaded methods (i.e. class constructors are frequently overloaded, and the only way to discriminate between one constructor and the other is to examine the method signature).

Note that an HDF file is not a requirement but serves as an optimization in implementing the trace hooks. The resulting trace stream consists of sequences of major/minor codes (with time stamps). A postprocessing phase takes the HDF file and merges it with a trace stream, resulting in a trace stream that identifies methods/classes by name. The following is an example of a trace stream that may be generated by merging trace data with the above HDF file:

| major | minor | timestamp | description |
| --- | --- | --- | --- |
| 12 | 1 | 15:985860940 | Dispatch thread: e18507a0 |
| 22 | 1 | 15:985833507 | ENTRY: TEST.method_X(I) |
| 12 | 1 | 15:985845671 | Dispatch thread: e17d5bb0 |

-continued

| major | minor | timestamp | description |
| --- | --- | --- | --- |
| 12 | 1 | 15:985860940 | Dispatch thread: e1807a0 |
| 22 | 81 | 15:985833507 | EXIT: TEST.method_X_exit |
| 22 | 2 | 15:985833507 | ENTRY: TEST.method_Y() |
| 22 | 82 | 15:985833507 | EXIT: TEST.method_Y_exit |

Therefore, the current version of the HDF must be identified, and then merged with the profiling information record.

Figures 2, 5:
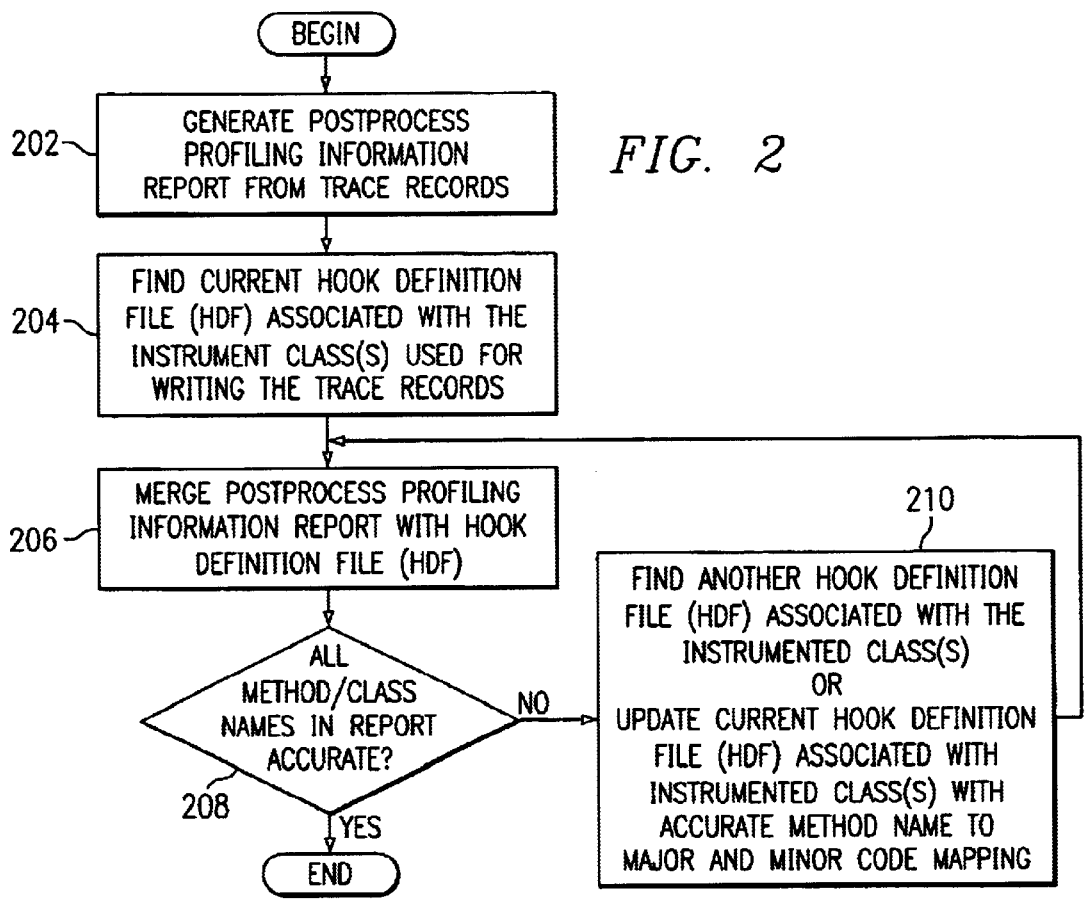
FIG. 2 is a flowchart depicting a process for generating a postprocess report with method names.
FIG. 5 is an illustration of a trace record file in accordance with a preferred embodiment of the present invention.

With respect to FIG. 2, a flowchart depicts a process for generating a postprocess report with method names. The process begins by generating a postprocess profiling information report from trace records in a trace file (step 202). Next, a current HDF file must be located for the instrumented class which generated the trace file (step 204). As discussed above, the HDF file is not physically located with the class so it could be stored anywhere. Once found, the HDF file is merged with the postprocess profiling information report (step 206). As also discussed above, methods are identified by major and minor codes in the profiling information report and the HDF file contains the mappings between method names and method major and minor codes for the instrumented class. After merging the profiling information report should include method names for all methods, however, the HDF may be incomplete or out of date so the method names in the merged profiling information report should be sampled for accuracy (step 208). If all methods in the report are identified by name and the user is satisfied of their correctness, the process ends. However, if methods are identifier by only their major and minor codes and/or methods are misnamed, the profiling information report must be merged with a more current HDF file. One of two options are possible. First, attempt to find another hook definition file (HDF) associated with the instrumented class (s) or the current HDF file must be updated with accurate method name to major and minor code mapping for the instrumented class (step 210). The profiling information report and HDF file can then be re-merged (step 206) and rechecked until the method names are accurate (step 208). The process for generating a profiling information report with method names is then complete.

Methods may be misnamed or left unnamed if the current version of the HDF is not used for merging with the profiling information report. Locating the current, correct version of the HDF file is essential for accurate results. Merging several candidate HDFs and checking the results takes time and is prone to user errors, especially where the user is unskilled or unfamiliar with either the method names or the merging process. Because the HDF file is a separate file and not physically associated with the class that generated the trace file, the HDF may become lost, necessitating the user generate an new HDF version prior to analyzing the profiling information report.

In an effort to alleviate the above-mentioned shortcomings, method name to major and minors codes mappings are included in the class file itself. In accordance with a preferred embodiment of the present invention static initializers are declared for instrumented methods in a class. For each instrumented method in a class, an entry is added to the class static initializers to output a hook which identifies the method by name and major and minor codes. When the class is loaded and initialized, the static initializers are executed, causing the hook identifying the method to be output. Because the hook has both the method name and the major and minor code for the method, the output provides a mapping between the method name and major and minor codes. Each hook may be written to a separate trace record in the trace file and during the postprocessing phase, all trace records that contain mappings are complied into a single file usable for merging with the profiling information report. One of ordinary skill in the art will realize that other options are possible other than merging the profiling information report with the compiled method mapping file. For example, a postprocessor may be modified to map the method name to the major and minor codes while creating the profiling information report. The report would then contain the method names without merging the profiling information report with the compiled method mapping file.

Figure 3:
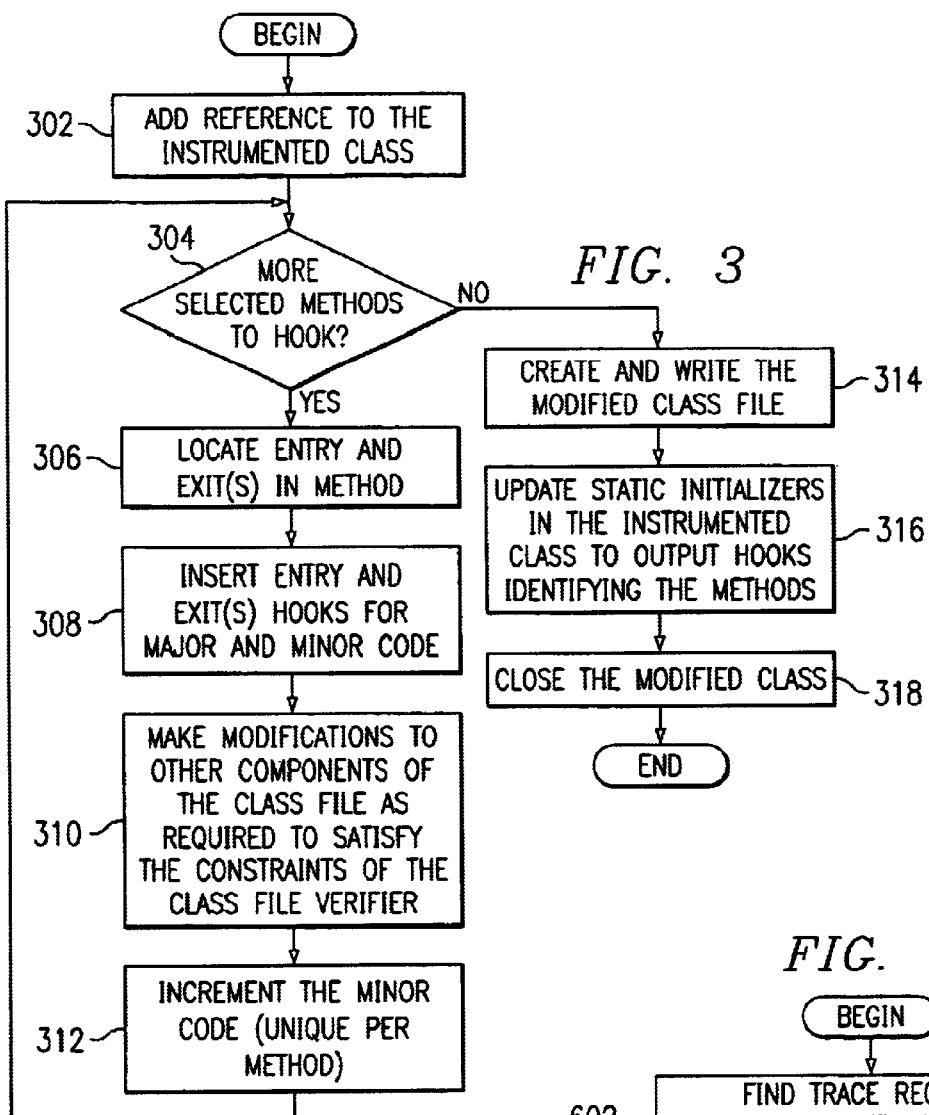
FIG. 3 is a flowchart depicting a process for instrumenting application classes without requiring separate files to correlate the instrumentation in accordance with a preferred embodiments of the present invention.

With respect to FIG. 3, a flowchart depicts a process for instrumenting application classes without requiring separate files to correlate the instrumentation in accordance with a preferred embodiments of the present invention. The example used for describing a preferred embodiment specifically describes instrumenting a method for entry and exit events but one of ordinary skill in the art will realizes that the process is readily modifiable for other event types other than method entries and exits.

Initially, a reference to the instrumentation class is added into the constant pool section of the class file (step 302), and a check is made for more methods to hook (step 304). If more methods are to be hooked, the entry point and one or more exit points are located are located in the method (step 306). Entry hook and exit hooks are inserted as needed for the major and minor codes (step 308).

Bytecode modification requires the insertion of Java bytecode instructions that affect the method invocations noted above. Insertion requires the identification of method bodies, interpretation of existing bytecodes, and location of entry and exit points. The modifications must be consistent with the criteria employed by the class file verifier. The class file verifier ensures that the bytecode, and the rest of the class file, is valid and can be executed by the Jvm. Thus, any other components which must be modified to ensure that they satisfy the constraints of the class file verifier are modified (step 310). Finally, the minor code is incremented to ensure that it is unique for each method (step 312).

When there are no more methods to hook, the modified class file is then created (step 314). Next, the static initializers for the instrumented class are updated to output hooks identifying the methods (step 316). Each hook includes a mapping between a method name and that method's major and minor codes. The modified class is then closed (step 318). The process for instrumenting application classes without requiring separate files to correlate the instrumentation is then complete.

With respect to FIG. 4, a flowchart depicts a process for executing code and outputting hooks that eliminate the need for a separate correlation file for instrumentation in accordance with a preferred embodiment of the present invention. The flowchart depicts an example of the preferred embodiment of the present invention with respect to the execution a portion of an application and not intended to delineate the execution of the a complete application. A convenient starting point in the process is where the code is executing inside an instrumented method (step 402). The method calls a different instrumented method (step 404).

The preferred process performs differently depending on whether the new method is in the pre loaded class, or the new method is in a different class. Therefore, a determination is then made as to whether the method being called is in the pre loaded class (step 406). If the method is in the pre loaded class, then the new method will be entered without necessitating a new class being loaded, the importance of this fact will become apparent below. A trace hook is found at the entry point for the new method (step 408). The hook identifies the entry point in the code by a method identifier. Next, the hook is written to, for example, a trace record (step 410). The hook identifies the entry by the method's major and minor codes. Once the new method is entered, code is again executed inside the method (step 402).

Returning to step 406, if the method being called is not in the pre loaded class, the new method's class must be opened (step 412). During the initialization process, a first static initializer from the class is then executed. Each static initializer causes a hook identifying an instrument method to be written to, for instance, a trace record (step 414). The hook includes both the method name and the method's major and minor codes. A check is made for another static initializer entry to be executed (step 416). If one exists it is executed and another hook is written to another trace record (step 414), until all static initializers are executed. Once the class is loaded and all static initializers are executed, the new method in the new class is entered at the entry point in the method where a hook is found (step 408). The hook identifies the entry. The hook is output, for example to a trace record (step 410). The hook identifies the entry by the method's major and minor codes in the trace record. Finally, code is again executed inside the new method (step 402). The process continue until finalization, or an error in the code occurs (either case not depicted in the example).

Figure 6:
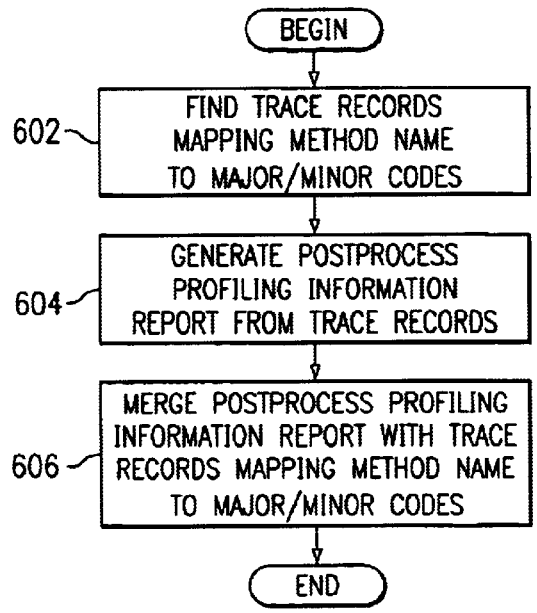
FIG. 6 is a flowchart depicting a method for generating a postprocess profiling information report, which includes method names, entirely from trace records in accordance with a preferred embodiment of the present invention.

In accordance with a preferred embodiment of the present invention, mapping information is written directly to a trace file whenever an new class file is opened. No longer is the HDF used to record information about the mapping between specific trace hook's major and minor codes and the methods into which it is inserted. FIG. 5 is an illustration of a trace stream or trace record file in accordance with a preferred embodiment of the present invention. Note that records 0–3 contain mappings for each method in the class between the major and minor codes and the class/method name. These records are output when the class was loaded and the static initializers are executed. Records 4–10 are trace data records, of the kind discussed above, which are generated in response to an event, such as a method entry or exit. Each of these records contain some performance information about the method. Note also that each of these records identify instrumented methods only by major and minor codes. By including the method name to major and minors codes mappings in the class file itself, the class to instrumentation mapping information is always available in the trace file with the performance profile information for the classes. The user is then relieved of the tasks of finding and validating the HDF. The process for generating a postprocess profiling information report with method names, discussed above with respect to FIG. 2, is much more simplified. FIG. 6 is a flowchart depicting a method for generating a postprocess profiling information report, which includes method names, entirely from trace records in accordance with a preferred embodiment of the present invention.

The process begins by finding trace records which identify instrumented methods in a class (step 602). This step may be performed simultaneously with post processing or may be performed independently from postprocessing. These records will usually occur in the trace stream at a point prior to a new method record where the new method is in a new instrumented class, this is where the class is loaded. These records include method name to method major and minor codes for all instrumented methods in the class. This mapping information from all records may be complied into a table for identifying all methods in a class or group of classes. Next, the trace records are postprocessed and the results output to a postprocess profiling information report (step 604). After postprocessing, the report identifies each method only by its major and minor codes. Finally, the mapping information from the trace records is merged with the postprocess profiling information report (step 606). The merged report identifies instrumented methods by their unique method names, and thus, is more understandable for the user.

In accordance with an alternative embodiment of the present invention, the postprocessor tracks the mapping information as it reads the individual trace records. Anytime a method identifier is to be output, in a report for instance, the postprocessor immediately maps the method's major and minor codes to a method name and only the method name is output. In either case, the process for generating a postprocess profiling information report, which includes method names, entirely from trace records is then complete.

The postprocessing report that is generated by merging trace data trace records with mapping information trace records is identical to the postprocessing report described above which is generated by merging trace data records with an HDF file. The merged postprocessing report generated from the trace record file 500 in FIG. 5 is illustrated below.

| major | minor | timestamp | description |
|---|---|---|---|
| 12 | 1 | 15:985860940 | Dispatch thread: e18507a0 |
| 22 | 1 | 15:985833507 | ENTRY: TEST.method__X(I) |
| 12 | 1 | 15:985845671 | Dispatch thread: e17d5bb0 |
| 12 | 1 | 15:985860940 | Dispatch thread: e1807a0 |
| 22 | 81 | 15:985833507 | EXIT: TEST.method__X_exit |
| 22 | 2 | 15:985833507 | ENTRY: TEST.method__Y() |
| 22 | 82 | 15:985833507 | EXIT: TEST.method__Y_exit |

Although the invention has been described with a certain degree of particularity, it should be recognized that elements thereof may be altered by persons skilled in the art without departing from the spirit and scope of the invention. One of the preferred implementations of the invention is as sets of instructions resident in the main memory 154 of one or more computer systems configured generally as described in FIG. 1A. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for supporting user specified instrumentation by modifying class files comprising:

instrumenting a routine, wherein the instrumented routine is in a class;

injecting a first trace hook in the instrumented routine, wherein the first trace hook identifies the instrumented routine by an identification code and the first trace hook is written to a record including the routine's identification code; and modifying a class file for the class, wherein the modification identifies the instrumented routine, by updating a static initializer in the class to output a second trace hook, wherein the second trace hook identifies the instrumented routine.

2. The method for supporting user specified instrumentation according to claim 1, wherein the second trace hook identifies the instrumented routine by routine name and identification code.

3. The method for supporting user specified instrumentation according to claim 2, wherein the second trace hook is written to a second record, and the first and second records are included in a trace stream, and further comprising the steps of:

post processing the trace stream, wherein a profiling information report is generated; and post processing the trace stream, wherein a profiling information report is generated; and merging the first and second trace records with the profiling information report, wherein routines in the report are identified by routine name.

4. A method for supporting user specified instrumentation by modifying class files comprising:

opening a class file;

executing a static initializer, wherein the static initializer contains routine identity mapping information; and writing a record which includes the routine identity mapping information, wherein the static initializer is a first static initializer containing first routine mapping information and the record is a first record, the method further includes;

executing a second static initializer, wherein the second static initializer contains second routine identity mapping information; and writing a second record which includes the second routine identity mapping information.

5. The method for supporting user specified instrumentation according to claim 4, wherein the first and second records are included in a trace stream.

6. The method for modifying a class file according to claim 4, wherein the routine is an object oriented programming method.

7. The method for supporting user specified instrumentation according to claim 5, further comprises:

collecting the first and second trace records;

post processing the trace stream, wherein a profiling information report is generated; and merging the first and second trace records with the profiling information report, wherein routines in the report are identified by routine name.

8. A method for supporting user specified instrumentation by modifying class files comprising:

identifying a routine in a class to be instrumented by routine name;

instrumenting the routine in the class;

modifying a class file for the class to include mapping information between routine instrumentation identifier and routine name identifier for the instrumented routine;

opening the class file;

writing a record, wherein the record comprises the mapping information between the routine instrumentation identifier and the routine name identifier for the instrumented routine;

executing the routine; and writing a trace record, wherein the trace record describes an aspect of the execution of the routine.

9. The method for supporting user specified instrumentation according to claim 8, wherein the routine instrumentation identifier includes the routine's major and minor codes.

10. The method for supporting user specified instrumentation according to claim 8 further comprises:

postprocessing the record and the trace record; and generating a report, wherein the report identifies the routine by the routine name identifier.

11. A data processing system for supporting user specified instrumentation by modifying class files comprising:

identifying means for identifying a routine in a class to be instrumented by routine name;

instrumenting means for instrumenting the routine in the class;

modifying means for modifying a class file for the class to include mapping information between routine instrumentation identifier and routine name identifier for the instrumented routine;

opening means for opening the class file;

writing means for writing a record, wherein the record comprises the mapping information between the routine instrumentation identifier and the routine name identifier for the instrumented routine;

executing means for executing the routine; and writing means for writing a trace record, wherein the trace record describes an aspect of the execution of the routine.

12. The system for supporting user specified instrumentation according to claim 11, wherein the routine instrumentation identifier includes the routine's major and minor codes.

13. The method for supporting user specified instrumentation according to claim 11 further comprises:

postprocessing means for postprocessing the record and the trace record; and generating means for generating a report, wherein the report identifies the routine by the routine name identifier.

14. A computer program product for supporting user specified instrumentation by modifying class files comprising:

instruction means for identifying a routine in a class to be instrumented by routine name;

instruction means for instrumenting the routine in the class;

instruction means for modifying a class file for the class to include mapping information between routine instrumentation identifier and routine name identifier for the instrumented routine;

instruction means for opening the class file;

instruction means for writing a record, wherein the record comprises the mapping information between the routine instrumentation identifier and the routine name identifier for the instrumented routine;

instruction means for executing the routine; and instruction means for writing a trace record, wherein the trace record describes an aspect of the execution of the routine.

15. The computer program product for supporting user specified instrumentation according to claim 14, wherein the routine instrumentation includes the routine's major and minor codes.

* * * * *

UNITED STATES PATENT AND TRADEMARK OFFICE
CERTIFICATE OF CORRECTION

PATENT NO. : 6,742,178 B1 Page 1 of 1
APPLICATION NO. : 09/620729
DATED : May 25, 2004
INVENTOR(S) : Berry et al.

It is certified that error appears in the above-identified patent and that said Letters Patent is hereby corrected as shown below:

(74) Attorney, Agent, or Firm: delete "Leslie A. Van Leeuven" and insert --Leslie A. Van Leeuwen--.

Signed and Sealed this

Twenty-eighth Day of November, 2006

JON W. DUDAS
*Director of the United States Patent and Trademark Office*